(12) United States Patent
Morita (10) Patent No.: US 10,015,350 B2
(45) Date of Patent: Jul. 3, 2018

(54) TERMINAL DEVICE, MAIL TRANSMISSION SYSTEM, AND TRANSMISSION METHOD

(71) Applicant: Konica Minolta, Inc., Chiyoda-ku (JP)

(72) Inventor: Akemi Morita, Nishinomiya (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/108,393

(22) Filed: Dec. 17, 2013

(65) Prior Publication Data

US 2014/0168702 A1 Jun. 19, 2014

(30) Foreign Application Priority Data

Dec. 19, 2012 (JP) .................................. 2012-276454

(51) Int. Cl.
*H04N 1/00* (2006.01)
*G06F 21/64* (2013.01)
*H04N 1/32* (2006.01)

(52) U.S. Cl.
CPC ....... *H04N 1/00973* (2013.01); *G06F 21/645* (2013.01); *H04N 1/00212* (2013.01); *H04N 1/00278* (2013.01); *H04N 1/32128* (2013.01); *H04N 2201/3238* (2013.01)

(58) Field of Classification Search
CPC ........... H04N 1/00838; H04N 1/00973; H04N 1/00278
See application file for complete search history.

(56) References Cited

U.S. PATENT DOCUMENTS

2003/0110226 A1* 6/2003 Inoue et al. .................. 709/206
2003/0126432 A1 7/2003 Tonisson
2009/0182876 A1* 7/2009 Hayashi ................. G06Q 20/06 709/225
2009/0217047 A1* 8/2009 Akashika ................ G06F 21/33 713/175
2010/0281267 A1 11/2010 Sakumoto

FOREIGN PATENT DOCUMENTS

| JP | 2003-234737 A | 8/2003 |
|---|---|---|
| JP | 2009171448 A | 7/2009 |
| JP | 2010-004154 A | 1/2010 |
| JP | 2010-278482 A | 12/2010 |
| JP | 2011086018 A | 4/2011 |

OTHER PUBLICATIONS

Japanese Office Action dated Dec. 16, 2014 issued in corresponding Japanese Patent Appln. No. 2012-276454, with English translation (18 pages).

* cited by examiner

*Primary Examiner* — Lennin Rodriguezgonzalez
(74) *Attorney, Agent, or Firm* — Buchanan Ingersoll & Rooney PC (57) ABSTRACT

A terminal device includes, as functions for transmitting a file with a digital signature via mail, a first communication unit for carrying out communication with a terminal device used by an authorizer when a distance from that terminal device is not greater than a prescribed distance, an obtaining unit for obtaining a value obtained from a file to be transmitted, which has been encrypted through encryption processing performed by making use of information exchanged with that terminal device, and a transmission instruction unit for outputting an instruction for mail transmission of the file and the obtained encrypted value.

15 Claims, 9 Drawing Sheets

TERMINAL DEVICE, MAIL TRANSMISSION SYSTEM, AND TRANSMISSION METHOD

This application is based on Japanese Patent Application No. 2012-276454 filed with the Japan Patent Office on Dec. 19, 2012, the entire content of which is hereby incorporated by reference.

BACKGROUND OF THE INVENTION

Field of the Invention

This invention relates to a terminal device, a mail transmission system, and a transmission method, and particularly to a terminal device, a mail transmission system, and a transmission method for mail transmission of a file with a digital signature.

Description of the Related Art

A technique for mail transmission of a file with a digital signature is available. Recently, a scanner, a printer, or an MFP (Multi-Functional Peripheral) which is combination of the former has a communication function, so that a file with a digital signature can be transmitted via mail from an image forming apparatus.

In mail transmission of a file with a digital signature in an office or the like, approval by another user as an authorizer such as a supervisor may be required. Namely, a user who transmits a file may be different from an authorizer.

In such a case, as one method, such a method that a user asks an authorizer to attach a digital signature to a file of interest in a personal computer or the like and then to perform an operation for mail transmission is exemplified. Alternatively, such a method that, in the case of using an image forming apparatus, an authorizer who has been asked uses his/her own log-in information to log in an image forming apparatus, to attach a digital signature, and then to perform an operation for mail transmission is also exemplified.

As a method for approval of an authorization key, for example, Japanese Laid-Open Patent Publication No. 2010-278482 discloses such a technique that, even when an encryption key used for a digital signature is revealed, by generating a substitute verification key by using an interaction algorithm, another verification key valid for that digital signature is generated so as not to invalidate the digital signature.

As set forth above, when a user who transmits a file with a digital signature is different from an authorizer, the authorizer has had to perform an operation for approval or an operation for mail transmission, which has been bothersome.

SUMMARY OF THE INVENTION

The present invention was made in view of such problems, and an object thereof is to provide a terminal device, a mail transmission system, and a transmission method capable of transmitting via mail, a file with a digital signature with an easy operation even when a user who transmits a file with a digital signature is different from an authorizer.

In order to achieve the object above, according to one aspect of the present invention, a terminal device is a terminal device capable of outputting an instruction for mail transmission of a file, and the terminal device includes a first communication unit for carrying out communication with another terminal device when a distance from another terminal device is not greater than a prescribed distance, an obtaining unit for obtaining a value obtained from the file encrypted through encryption processing performed by making use of information exchanged with another terminal device through the first communication unit, and an instruction unit for outputting an instruction for mail transmission of the file and the encrypted value.

Preferably, the first communication unit requests another terminal device to perform the encryption processing by transmitting the file to another terminal device when the distance from another terminal device is not greater than the prescribed distance while the file is open, and the obtaining unit obtains from another terminal device, the value obtained from the file and encrypted in another terminal device.

More preferably, the obtaining unit obtains the encrypted value from another terminal device when communication with another terminal device has continued through the first communication unit from a time point of transmission of the file to another terminal device until a time point of completion of the encryption processing in another terminal device.

Preferably, the terminal device further includes a mail transmission unit, and the instruction unit outputs to the mail transmission unit, an instruction for mail transmission of the file and the encrypted value.

Preferably, the terminal device further includes a management unit for managing the encrypted value obtained from another terminal device, and the management unit causes a storage device to store the encrypted value when the encrypted value is obtained from another terminal device and erases the encrypted value from the storage device after the instruction unit outputs the instruction.

Preferably, the obtaining unit includes an encryption unit for encrypting with an encryption key, a value obtained from the file, the encryption unit generates an encryption key and information paired with the encryption key, for analysis of information encrypted with the encryption key, the first communication unit requests another terminal device to provide information for proving that the information for analysis is authentic, by transmitting the information for analysis to another terminal device, when the distance from another terminal device is not greater than the prescribed distance, and the encryption unit encrypts with the encryption key, a value obtained from the file when the information for proving from another terminal device has been obtained.

Preferably, the terminal device further includes a second communication unit for carrying out communication with an image processing apparatus when a distance from the image processing apparatus is not greater than a prescribed distance, the second communication unit transmits to the image processing apparatus, the encrypted value and the information for proving when the distance from the image processing apparatus is not greater than the prescribed distance, and the instruction unit outputs to the image processing apparatus, an instruction for mail transmission of the file stored in the image processing apparatus, the encrypted value, and the information for proving.

More preferably, the second communication unit transmits to the image processing apparatus, a command instructing execution of a scanning operation for obtaining image data as the file when the distance from the image processing apparatus is not greater than the prescribed distance, and the instruction unit outputs the instruction to the image processing apparatus when communication with the image processing apparatus has continued through the second communication unit from a time point of transmission of the command to the image processing apparatus until a time point of completion of the encryption processing in the encryption unit.

Preferably, the first communication unit receives information for log-in to the image processing apparatus from another terminal device when the distance from another terminal device is not greater than the prescribed distance, and the second communication unit logs in the image processing apparatus by using the received information for log-in when the command is transmitted to the image processing apparatus.

Preferably, the terminal device further includes a management unit for managing the information for proving from another terminal device, and the management unit causes a storage device to store the information for proving when the information for proving is obtained from another terminal device and erases the information for proving from the storage device after the instruction unit outputs the instruction to the image processing apparatus.

According to another aspect of the present invention, a mail transmission system includes a plurality of terminal devices and an image processing apparatus. The plurality of terminal devices and the image processing apparatus can communicate with each other when they are at a prescribed distance or closer. A first terminal device among the plurality of terminal devices includes an encryption unit for encrypting with an encryption key, a value obtained from a file. The mail transmission system generates an encryption key in the encryption unit, and information paired with the encryption key, for analysis of information encrypted with the encryption key, requests a second terminal device among the plurality of terminal devices to provide information for proving that the information for analysis is authentic, by transmission of the information for analysis to the second terminal device when a distance from the second terminal device is not greater than the prescribed distance, encrypts with the encryption key, a value obtained from the file when the information for proving from the second terminal device has been obtained, and outputs an instruction for mail transmission of the file stored in the image processing apparatus, the encrypted value, and the information for proving by transmission of the encrypted value and the information for proving to the image processing apparatus when a distance from the image processing apparatus is not greater than the prescribed distance.

According to yet another aspect of the present invention, a non-transitory computer-readable storage medium stores a control program for causing a controller of a terminal device to perform processing for outputting an instruction for mail transmission of a file. The terminal device includes a communication unit capable of communicating with another terminal device when a distance from another terminal device is not greater than a prescribed distance. The program causes the controller to perform the steps of requesting another terminal device to perform encryption processing of a value obtained from the file by transmitting the file to another terminal device when a distance from another terminal device is not greater than the prescribed distance while the file is being executed, receiving the encrypted value from another terminal device, and transmitting the file and the encrypted value from another terminal device via mail.

According to yet another aspect of the present invention, a non-transitory computer-readable storage medium stores a control program for causing a controller of a terminal device to perform processing for outputting an instruction for mail transmission of a file. The terminal device includes a communication unit capable of communicating with each of another terminal device and an image processing apparatus when a distance from each of the terminal device and the image processing apparatus is not greater than a prescribed distance. The program causes the controller to perform the steps of generating an encryption key and information paired with the encryption key, for analysis of information encrypted with the encryption key, requesting another terminal device to provide information for proving that the information for analysis is authentic, by transmitting the information for analysis to another terminal device, when the distance from another terminal device is not greater than the prescribed distance, receiving the information for proving from another terminal device and storing the information for proving, instructing the image processing apparatus to perform a scanning operation and to obtain image data as the file when the distance from the image processing apparatus is not greater than the prescribed distance, receiving from the image processing apparatus, the file or a value obtained from the file, encrypting with the encryption key, the value obtained from the file when the information for proving has been stored, and instructing mail transmission of the file stored in the image processing apparatus, the encrypted value, and the information for proving, by transmitting the encrypted value and the information for proving to the image processing apparatus, when communication with the image processing apparatus has continued.

According to yet another aspect of the present invention, a transmission method is a method of mail transmission of a file in a terminal device, and the terminal device includes a communication unit capable of communicating with another terminal device when a distance from another terminal device is not greater than a prescribed distance. The transmission method includes the steps of requesting, by the terminal device, another terminal device to perform encryption processing of a value obtained from the file, by transferring the file from the terminal device to another terminal device, when a distance between the terminal device and another terminal device is not greater than the prescribed distance while the file is being executed in the terminal device, transferring the encrypted value from another terminal device to the terminal device in response to the request, and transmitting via mail, by the terminal device, the file and the encrypted value from another terminal device.

According to yet another aspect of the present invention, a transmission method is a method of mail transmission of a file in a terminal device, and the terminal device includes a communication unit capable of communicating with each of another terminal device and an image processing apparatus when a distance from each of another terminal device and the image processing apparatus is not greater than a prescribed distance. The steps of generating, by the terminal device, an encryption key and information paired with the encryption key, for analysis of information encrypted with the encryption key, requesting, by the terminal device, another terminal device to provide information for proving that the information for analysis is authentic, by transmitting the information for analysis from the terminal device to another terminal device when a distance between the terminal device and another terminal device is not greater than the prescribed distance, receiving, by the terminal device, the information for proving from another terminal device and storing the information for proving, instructing, by the terminal device, the image processing apparatus to obtain image data as the file by performing a scanning operation when a distance between the terminal device and the image processing apparatus is not greater than the prescribed distance, transferring, by the image processing apparatus, the file or a value obtained from the file to the terminal device, encrypting with the encryption key, by the terminal device, the value obtained from the file when the information for proving has been stored in the terminal device, and instructing, by the terminal device, mail transmission of the file stored in the image processing apparatus, the encrypted value, and the information for proving, by transmitting the encrypted value and the information for proving to the image processing apparatus, when communication between the terminal device and the image processing apparatus has continued, are included.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings. In the description below, the same elements and components have the same reference characters allotted. Their label and function are also identical. Therefore, description thereof will not be repeated.

<System Configuration>

Figure 1:
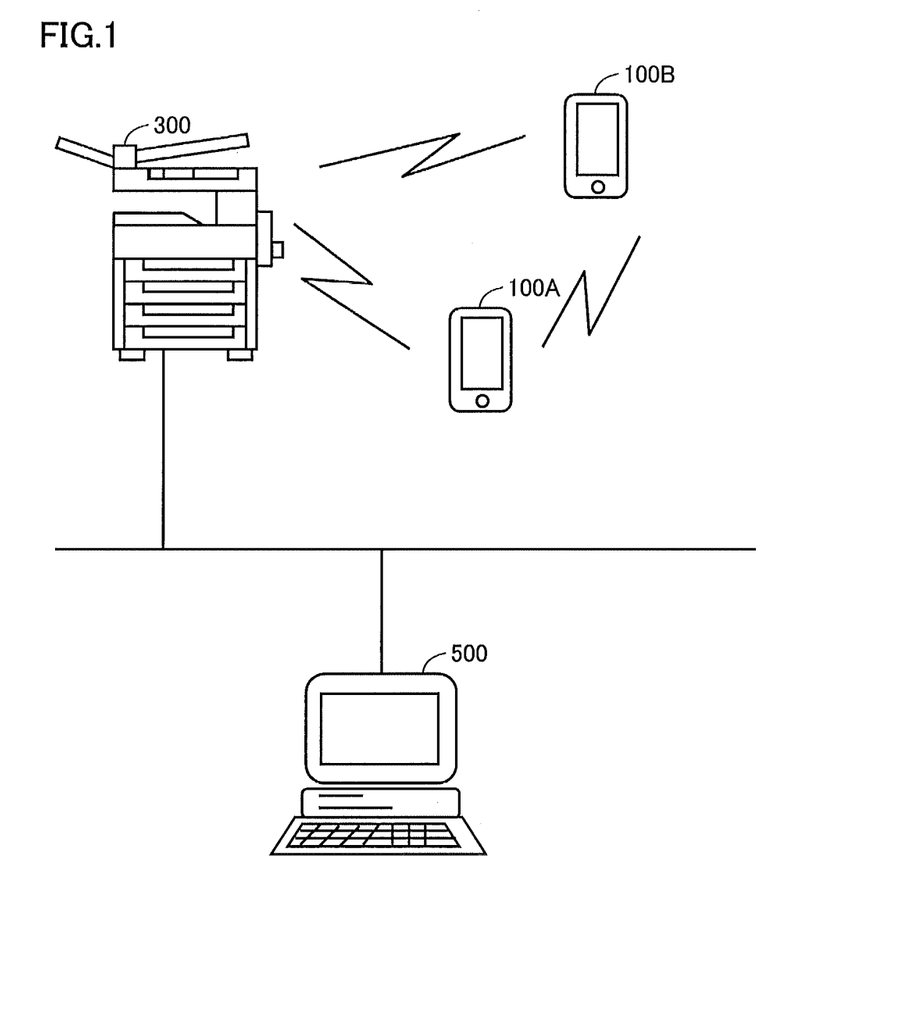
FIG. 1 is a diagram showing a specific example of a configuration of a mail transmission system according to an embodiment.

FIG. 1 is a diagram showing a specific example of a configuration of a mail transmission system according to an embodiment.

Referring to FIG. 1, a mail transmission system includes a first terminal device 100A which is a terminal device used by a user who transmits a file with a digital signature via mail, a second terminal device 100B which is a terminal device used by another user who is an authorizer of the digital signature, an MFP (Multi-Functional Peripheral) 300 serving as an image processing apparatus, and a PC (personal computer) 500 which is a transmission destination of a file.

MFP 300 and PC 500 are connected to a wired or wireless communication network such as LAN (Local Area Network) and can communicate with each other. This communication network may also include first terminal device 100A and second terminal device 100B.

First terminal device 100A and second terminal device 100B can carry out wireless communication within a prescribed distance which is a short distance, separately from the communication network above. This communication can be realized, for example, by adopting such a technique as NFC (Near Field Communication) which is the international standards for the near field communication technology. With this technique, for example, about 10 cm is assumed as the prescribed distance above.

Wireless communication within a prescribed distance which is a short distance can also be carried out similarly between first terminal device 100A, second terminal device 100B and MFP 300. This communication can again be realized by adopting such a technique as NFC. With this technique, for example, about 10 cm is assumed as the prescribed distance above.

It is noted that, for example, a portable telephone, a compact notebook PC, an electronic book, and the like are applicable for first terminal device 100A and second terminal device 100B. First terminal device 100A and second terminal device 100B are representatively also referred to as a terminal device 100.

<Device Configuration>

Figure 2:
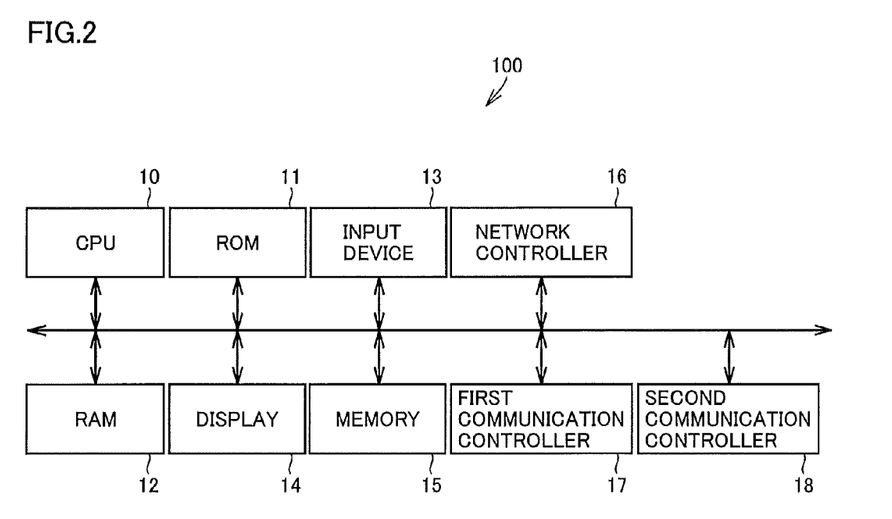
FIG. 2 is a diagram showing a specific example of a hardware configuration of a terminal device included in the mail transmission system.

FIG. 2 is a diagram showing a specific example of a hardware configuration of terminal device 100.

Referring to FIG. 2, terminal device 100 includes a CPU (Central Processing Unit) 10 which is an operation device for overall control, a ROM (Read Only Memory) 11 for storing a program or the like executed by CPU 10, a RAM (Random Access Memory) 12 for functioning as a work area during execution of a program in CPU 10, an input device 13 such as a switch for accepting an operation input to terminal device 100, a display 14, a memory 15 for storing a file or the like, a network controller 16 for controlling communication through the communication network, a first communication controller 17 for controlling short-range communication with another terminal device, and a second communication controller 18 for controlling short-range communication with MFP 300.

In the case that short-range communication with another terminal device and short-range communication with MFP 300 make use of the same communication function, first communication controller 17 and second communication controller 18 may be one function.

Figure 3:
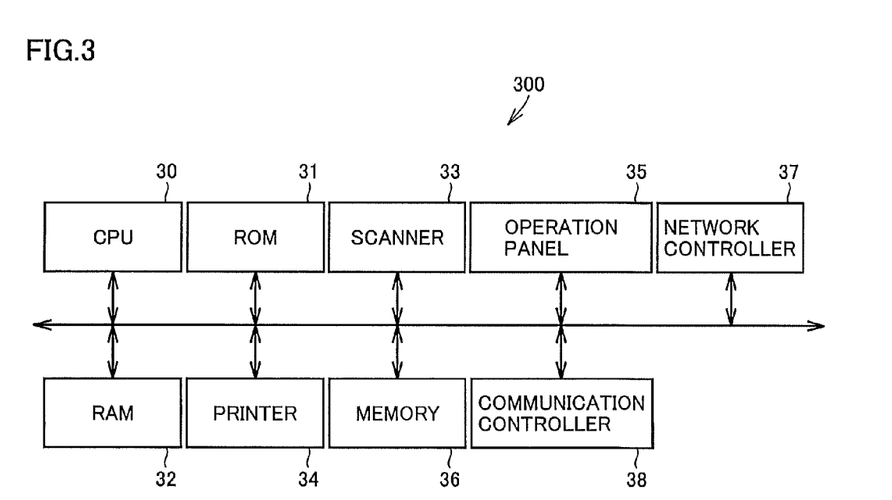
FIG. 3 is a diagram showing a specific example of a hardware configuration of an MFP (Multi-Functional Peripheral) included in the mail transmission system.

FIG. 3 is a diagram showing a specific example of a hardware configuration of MFP 300.

Referring to FIG. 3, MFP 300 includes a CPU 30 which is an operation device for overall control, a ROM 31 for storing a program or the like executed by CPU 30, a RAM 32 for functioning as a work area during execution of a program in CPU 30, a scanner 33 for obtaining image data by optically scanning a document placed on a not-shown platen, a printer 34 for fixing image data onto printing paper, an operation panel 35 including a touch panel for displaying information or accepting an operation input to MFP 300, a memory 36 for storing image data or the like, a network controller 37 for controlling communication through the communication network, and a communication controller 38 for controlling short-range communication with terminal device 100.

Operation panel 35 includes a touch panel and a group of operation keys which are not shown. The touch panel is constructed such that a display device such as a liquid crystal display and a position indicator such as an optical touch panel or a capacitive touch panel are layered, displays an operation screen, and specifies a position indicated on the operation screen. CPU 30 causes the touch panel to display an operation screen based on data for displaying a screen which is stored in advance.

First Embodiment

<Operation Outline>

Figure 4:
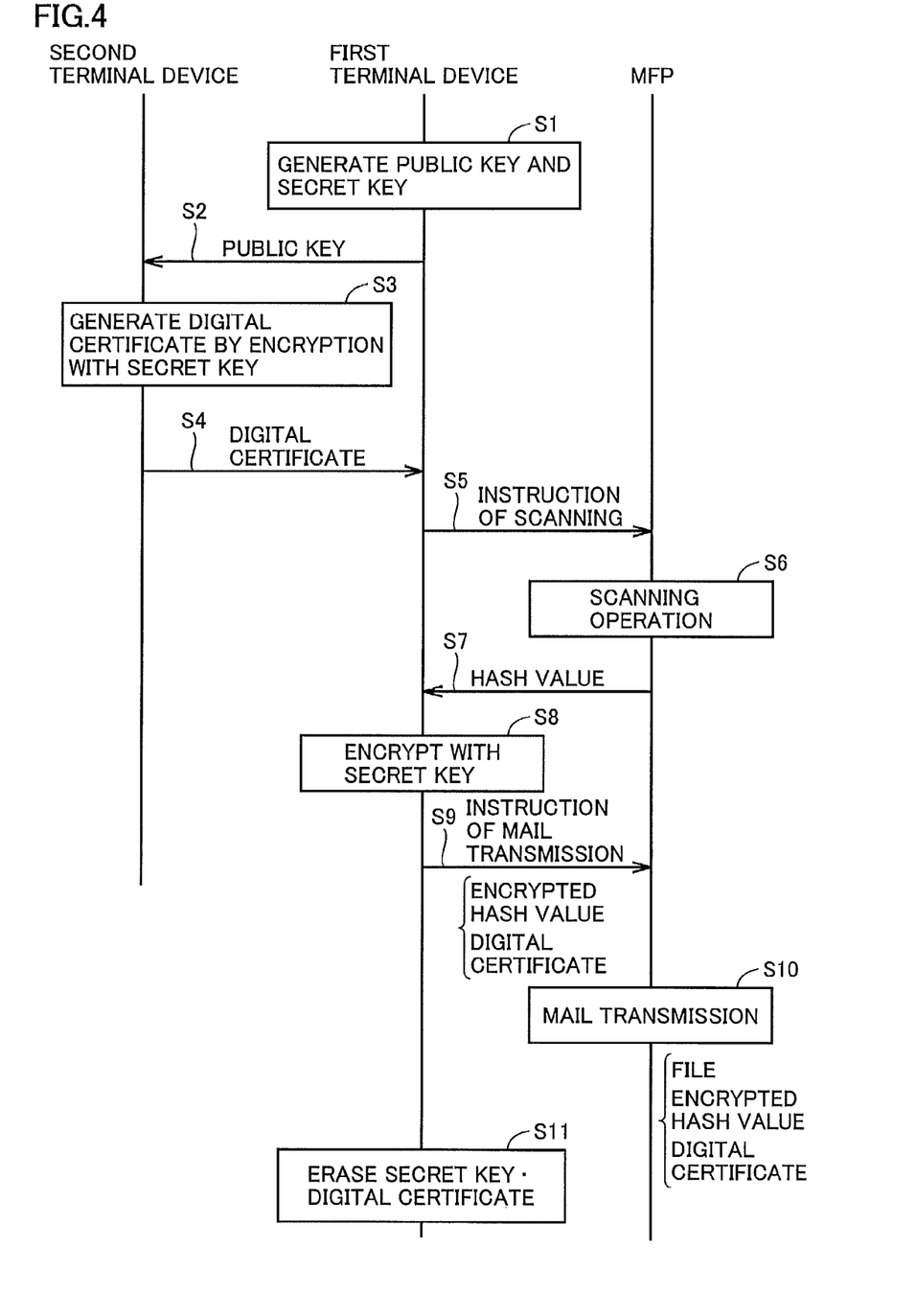
FIG. 4 is a diagram representing a flow of operations in the mail transmission system according to a first embodiment.

FIG. 4 is a diagram representing a flow of operations in mail transmission of a file with a digital signature in a mail transmission system according to a first embodiment. In the mail transmission system according to the first embodiment, image data obtained by scanning of a document in MFP 300 serves as a file to be transmitted. A digital signature is attached to the file. By making use of a mail transmission function of MFP 300, a file with a digital signature is transmitted via mail from MFP 300 to PC 500.

Referring to FIG. 4 for details, a user who transmits a file with a digital signature via mail starts up an application in the first terminal device. The first terminal device generates a secret key used for encryption and a public key which is information for analysis paired with the secret key (step S1).

For example, the user brings the first terminal device closer to the second terminal device used by an authorizer of a digital signature such as a supervisor. When the second terminal device is present within a distance allowing short-range communication from the first terminal device, the first terminal device transmits the generated public key to the second terminal device. Through this transmission, the first terminal device requests the second terminal device to issue a digital certificate (step S2). For example, it is assumed that the user shows a document which is a printed matter of a file of interest to an authorizer such as a supervisor, reports contents thereof, obtains approval, and then brings his/her terminal device closer. In step S2 above, owner information (information on a user or the like) may be transmitted in addition to the public key, from the first terminal device to the second terminal device, or this information may be stored in advance in the second terminal device.

In this case, the first terminal device may check with the user whether or not connection can be established, by displaying on display 14 identification information or the like of the second terminal device which is a terminal device within coverage of short-range communication, accept an instruction for connection from the user, and then start short-range communication, which is also applicable to description hereafter.

When the second terminal device receives the public key from the first terminal device, it generates a digital certificate by encryption with its own secret key (step S3). Here, the second terminal device may display on display 14, a screen for checking whether or not a digital certificate can be generated, accept an instruction for generation of a digital certificate from the user who is the supervisor, and then generate the digital certificate.

The digital certificate includes information specifying the user, the public key from the first terminal device, information specifying the user who is the authorizer, a digital signature of the user who is the authorizer, and the like.

The second terminal device transmits the generated digital certificate to the first terminal device (step S4). The first terminal device which received the digital certificate stores the digital certificate in a prescribed area in its own storage device.

Thereafter, the user brings the first terminal device closer to the MFP. When the MFP is present within a distance allowing short-range communication from the first terminal device, the first terminal device transmits to the MFP, a command instructing scanning of a designated document (such as a document set on the platen) (step S5). Similarly again, the first terminal device may accept an instruction from the user as to whether or not connection to the MFP can be established.

Here, prior to an instruction for scanning, the first terminal device may transmit to the MFP, log-in information of the user which is stored in advance, and a log-in operation may be performed in the MFP. Thus, the user permitted to perform an operation of the MFP instructs scanning and performs subsequent operations.

Alternatively, as log-in information of an authorizer is received from the second terminal device simultaneously with the digital certificate, the log-in information of the authorizer may be transmitted from the first terminal device to the MFP prior to the instruction for scanning, and the log-in operation may be performed by using the log-in information in the MFP. Thus, even when the user who tries mail transmission of a file is not permitted to perform an operation of the MFP, an instruction for scanning and subsequent operations are permitted by the authority of the permitted authorizer. In addition, operation history that mail has been transmitted can be recorded as the operation history of the authorizer.

The MFP performs a scanning operation in response to a command from the first terminal device (step S6) and obtains image data as a file to be transmitted. The MFP calculates a specific value by using a prescribed function for the file. For example, a hash function is exemplified as the prescribed function. In the case that the prescribed function is the hash function, a hash value is calculated as a specific value. Naturally, another function may be applied and another value may be calculated. The MFP transmits the calculated hash value to the first terminal device (step S7).

Though it is assumed in this example that a hash value is calculated from a file on the MFP side, a file itself may be transmitted from the MFP to the first terminal device and a hash value may be calculated in the first terminal device.

When the digital certificate from the second terminal device has been stored, the first terminal device uses the secret key generated in step S1 to encrypt the hash value (step S8). Thus, a digital signature is generated. Then, the first terminal device transmits the encrypted hash value which is the digital signature and the digital certificate from the second terminal device to the MFP. Through this transmission, the MFP is instructed to carry out mail transmission of the file (step S9).

When the MFP receives the encrypted hash value which is the digital signature and the digital certificate from the first terminal device, it transmits via mail the corresponding file together with the digital signature and the digital certificate therefor, to the user of PC 500 which is a designated transmission destination (step S10).

To the file transmitted via mail in this example, the digital signature of the user of the first terminal device (the hash value encrypted with the encryption key of the user) and the digital certificate in which authenticity of the digital signature including a public key for decryption thereof has been proved by the authorizer are attached. Therefore, the user of PC 500 who received this file via mail can use the public key included in the digital signature to decrypt the encrypted hash value which is the digital signature, and can obtain the hash value. In addition, the user can obtain the hash value by applying the hash function to the received file. Then, the user can check authenticity of the file based on comparison thereof.

It is noted that, in the first terminal device, after the MFP has been instructed to carry out mail transmission in step S9, the stored digital certificate and secret key are erased from the storage device. Erasing may be done after mail transmission from the MFP has been confirmed. Thus, usage unintended by the authorizer such as transmission of another file with the use of the secret key corresponding to the public key once approved by the authorizer can be prevented.

<Functional Configuration>

Figure 5:
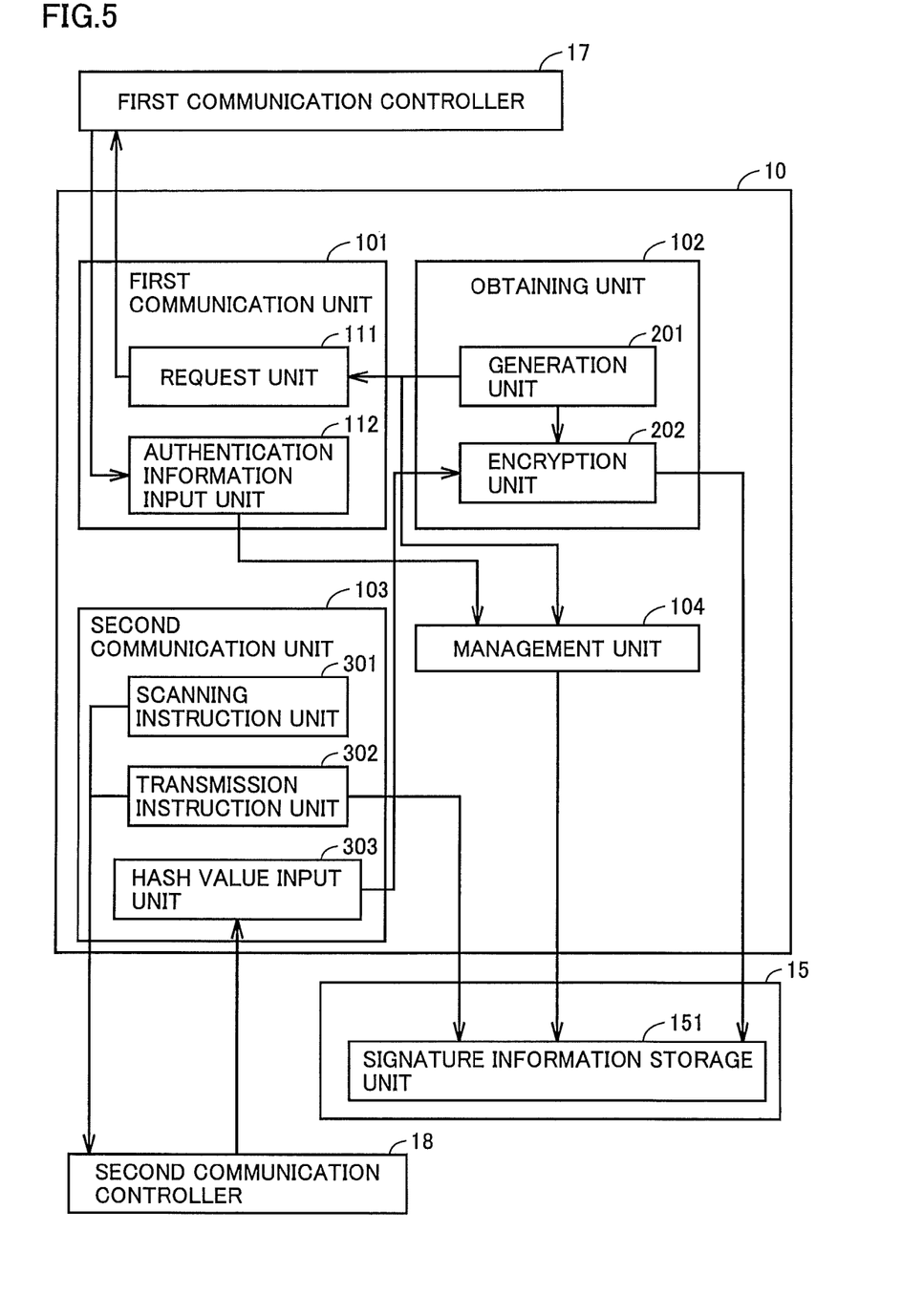
FIG. 5 is a block diagram showing a specific example of a functional configuration of a terminal device according to the first embodiment.

FIG. 5 is a block diagram showing a specific example of a functional configuration of terminal device 100 for performing the operations above. Each function shown in FIG. 5 is realized mainly by CPU 10 as CPU 10 reads and executes a program (an application) stored in ROM 11 while it develops the program (application) on RAM 12. At least a part thereof, however, may be realized by the hardware configuration represented in FIG. 2.

Referring to FIG. 5, memory 15 includes a signature information storage unit 151 which is a storage area for storing a generated secret key and a digital certificate.

Referring further to FIG. 5, CPU 10 includes a first communication unit 101 for carrying out communication with the second terminal device through first communication controller 17 as a distance from the second terminal device is not greater than a prescribed distance allowing short-range communication (for example, approximately 10 cm), an obtaining unit 102 for obtaining a value encrypted through encryption processing performed by making use of information exchanged with the second terminal device through first communication unit 101 and obtained from a file to be transmitted, which is a digital signature, a second communication unit 103 for carrying out communication with MFP 300 as a distance from MFP 300 is not greater than a prescribed distance allowing short-range communication (for example, approximately 10 cm), and a management unit 104 for managing a digital certificate from the second terminal device.

Obtaining unit 102 includes a generation unit 201 for generating a secret key and a public key for encryption processing and an encryption unit 202 for obtaining a digital signature by encrypting with the secret key, a hash value as one example of a value obtained from a file to be transmitted.

First communication unit 101 includes a request unit 111 for requesting the second terminal device to generate a digital certificate by transmission of the information including the public key generated in generation unit 201 to the second terminal device through first communication controller 17 and an authentication information input unit 112 for accepting input of a digital certificate from the second terminal device through first communication controller 17.

Second communication unit 103 includes a scanning instruction unit 301 for transmitting a command instructing MFP 300 to perform a scanning operation for obtaining image data as a file to be transmitted, a transmission instruction unit 302 for outputting an instruction for mail transmission, and a hash value input unit 303 for accepting from MFP 300 through second communication controller 18, input of a hash value as one example of a value obtained from the file.

Terminal device 100 according to the first embodiment transmits with transmission instruction unit 302, an encrypted value which is a digital signature and a digital certificate from the second terminal device through second communication controller 18 to MFP 300. Through this transmission, terminal device 100 instructs MFP 300 to transmit via mail the file with a hash value encrypted with a secret key which is a digital signature and a digital certificate including a public key.

Management unit 104 causes signature information storage unit 151 which is a prescribed storage area to store the generated secret key and the digital certificate from the second terminal device. Management unit 104 erases such information from signature information storage unit 151 after an instruction for mail transmission is output from transmission instruction unit 302.

It is noted that second communication unit 103 may include a function for accepting input of a file itself, instead of hash value input unit 303. Encryption unit 202 may apply a hash function or the like to the file, calculate a hash value which is one example of a specific value, and then perform encryption processing.

<Operation Flow>

Figure 6:
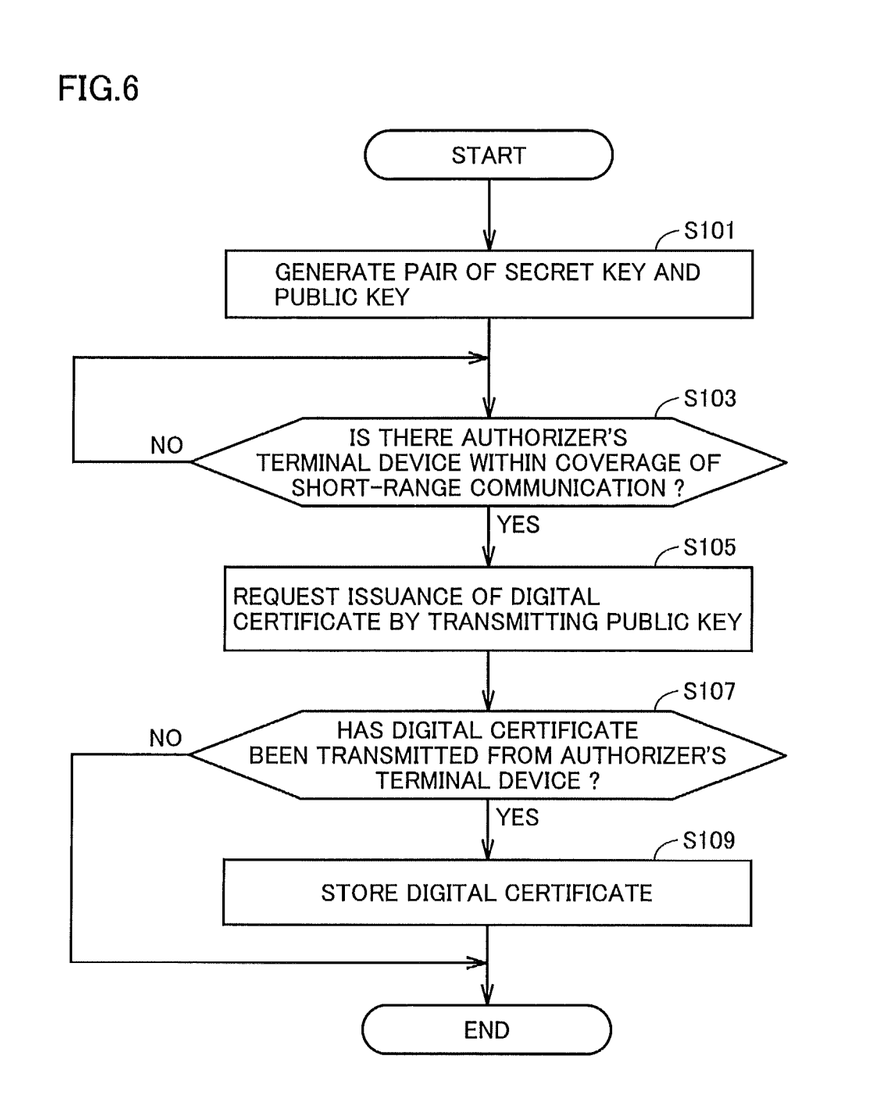
FIG. 6 is a flowchart representing a flow of operations for obtaining a digital certificate from a second terminal device which is an authorizer's terminal device, in a first terminal device according to the first embodiment.

FIG. 6 is a flowchart representing a flow of operations for obtaining a digital certificate from second terminal device 100B which is an authorizer's terminal device, in first terminal device 100A according to the first embodiment. The operation represented in the flowchart in FIG. 6 is started as CPU 10 in first terminal device 100A reads and starts up a program (an application) stored in ROM 11. This operation is realized as CPU 10 executes the program while it develops the program on RAM 12 and exhibits each function in FIG. 5.

Referring to FIG. 6, when the application is started up, CPU 10 generates a pair of a secret key and a public key in accordance with the program (step S101). Then, CPU 10 monitors whether or not second terminal device 100B which is an authorizer's terminal device is present within a prescribed distance which is a distance allowing short-range communication.

When presence of second terminal device 100B within the prescribed distance is detected (YES in step S103), CPU 10 requests issuance of a digital certificate by carrying out short-range communication with second terminal device 100B and transmitting information such as the public key generated in step S101 to second terminal device 100B (step S105).

When the digital certificate is transmitted from second terminal device 100B while short-range communication has continued (YES in step S107), CPU 10 causes the digital certificate to be stored in a prescribed storage area (step S109). Then, CPU 10 ends a series of operations.

It is noted that, when a digital certificate was not transmitted from second terminal device 100B while short-range communication has continued or when short-range communication has already ended and reception has failed even though a digital certificate was transmitted (NO in step S107), CPU 10 skips a subsequent operation. Then, CPU 10 ends a series of operations. In this case, a digital certificate is not stored in memory 15. Therefore, CPU 10 cannot instruct MFP 300 to carry out mail transmission which will be described later.

Namely, in order to receive a digital certificate from second terminal device 100B and to store the same in step S107, short-range communication with second terminal device 100B should continue from request for issuance of a digital certificate at least until transmission of a digital certificate. Namely, when short-range communication with second terminal device 100B is started in step S103 and thereafter a digital certificate is transmitted from second terminal device 100B while that communication has continued, CPU 10 can receive and store the digital certificate.

It is noted that log-in information for log-in to MFP 300 may be transmitted together with a digital certificate from the second terminal device. In this case, CPU 10 stores also log-in information together with the digital certificate.

Figure 7:
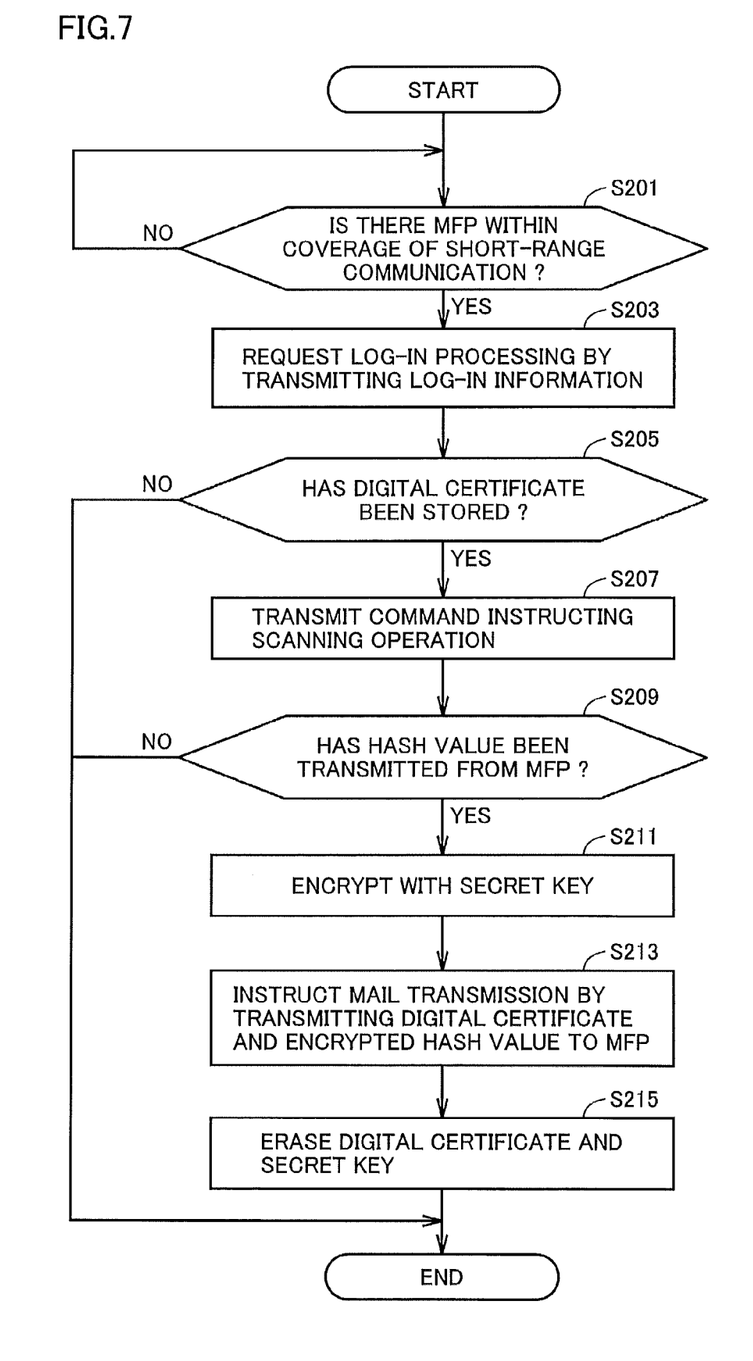
FIG. 7 is a flowchart representing a flow of operations for instructing an MFP 300 to carry out mail transmission of a file, in a first terminal device 100A according to the first embodiment.

FIG. 7 is a flowchart representing a flow of operations for instructing MFP 300 to carry out mail transmission of a file, in first terminal device 100A according to the first embodiment. The operation represented in the flowchart in FIG. 7 is also started as CPU 10 in first terminal device 100A reads and starts up a program (an application) stored in ROM 11. This operation is also realized as CPU 10 executes the program while it develops the program on RAM 12 and exhibits each function in FIG. 5.

Referring to FIG. 7, when the application is started up, CPU 10 monitors whether or not MFP 300 is present within a prescribed distance which is a distance allowing short-range communication in accordance with the program.

When presence of MFP 300 within the prescribed distance is detected (YES in step S201), CPU 10 requests log-in processing by carrying out short-range communication with MFP 300 and transmitting the stored log-in information to MFP 300 (step S203).

The log-in information transmitted in step S203 may be log-in information of a user instructing file transmission, or in the case that log-in information of an authorizer is stored as described above, may be that log-in information. Specifically, when log-in information of an authorizer is stored in a prescribed area of memory 15, CPU 10 may request log-in processing by an authorizer, by transmitting the log-in information. Alternatively, CPU 10 may first transmit log-in information of the user of first terminal device 100A and then request log-in processing by the user, and thereafter, in the case that short-range communication has continued at least for a time period defined in advance, it may request log-in processing by an authorizer, by transmitting the stored log-in information of the authorizer.

CPU 10 scans a prescribed area of memory 15 and checks whether or not a digital certificate has been stored. Consequently, when the digital certificate has been stored (YES in step S205), CPU 10 transmits a command instructing MFP 300 to perform a scanning operation for obtaining image data which is a file to be transmitted, while short-range communication has continued (step S207).

When a digital certificate has not been stored, that is, approval by an authorizer has not been obtained (NO in step S205), CPU 10 skips subsequent operations. Then, CPU 10 ends a series of operations. In this case, a file is not transmitted.

When a hash value which is one example of a specific value obtained from the file is transmitted from MFP 300 while short-range communication has continued (YES in step S209), CPU 10 encrypts the hash value with a stored secret key (step S211). Then, CPU 10 instructs mail transmission of the file, by transmitting the stored digital certificate and the hash value encrypted in step S211 to MFP 300 (step S213). Thereafter, CPU 10 erases the digital certificate and the secret key from the prescribed area of memory 15 (step S215). Then, CPU 10 ends a series of operations. When log-in information of the authorizer has also been stored, CPU 10 erases also that log-in information in step S215.

In this case, in MFP 300, in response to the instruction, such an operation that an encrypted hash value which is a digital signature and a digital certificate are attached to a stored file and mail is transmitted to the user of PC 500 which is a designated destination is performed.

When a hash value is not transmitted from MFP 300 while short-range communication has continued or when short-range communication has already ended and reception has failed even though a hash value was transmitted (NO in step S209), CPU 10 skips subsequent operations. Then, CPU 10 ends a series of operations. In this case, a file is not transmitted.

In the case that short-range communication has already ended by the time when CPU 10 outputs an instruction for mail transmission to MFP 300 in step S213 as well, an instruction is not transmitted. In this case, CPU 10 may skip the operation in step S215 and end a series of operations.

Namely, in order to receive a hash value from MFP 300 in step S209 and to output an instruction for mail transmission to MFP 300 in step S213, short-range communication with MFP 300 should continue from request of log-in processing at least until output of an instruction for mail transmission.

Second Embodiment

<Operation Outline>

Figure 8:
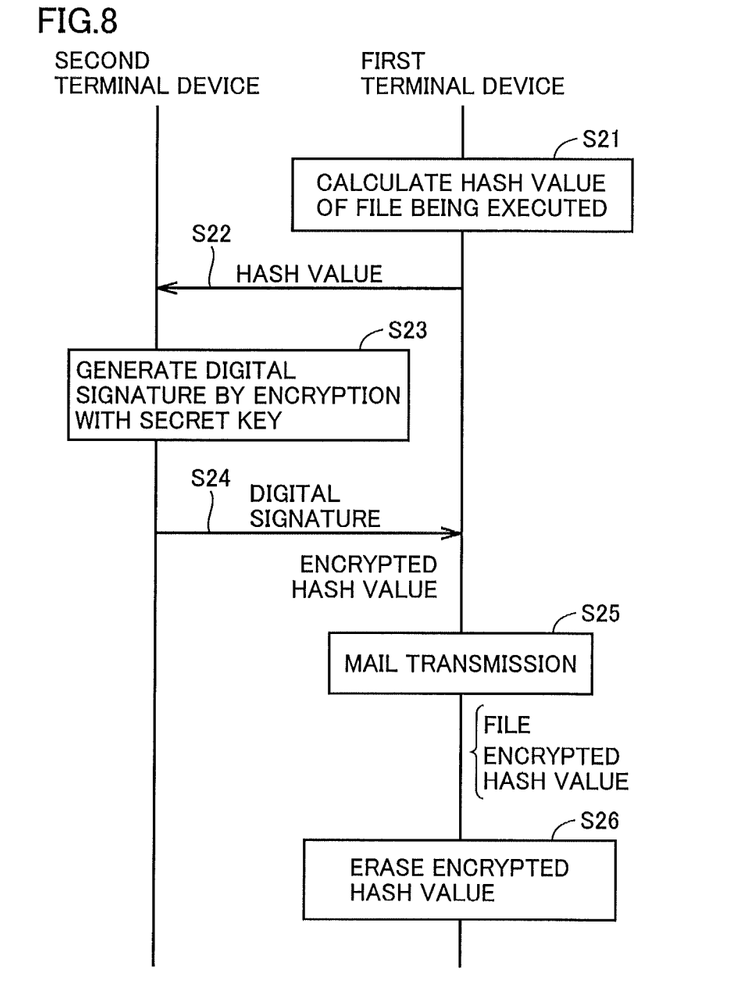
FIG. 8 is a diagram representing a flow in a mail transmission system according to a second embodiment.

FIG. 8 is a diagram representing a flow of operations in mail transmission of a file with a digital signature in a mail transmission system according to a second embodiment. In the mail transmission system according to the second embodiment, a mail is transmitted from first terminal device 100A, with a digital signature from an authorizer being attached to a file stored in first terminal device 100A.

Referring to FIG. 8 for details, a user who transmits a file with a digital signature via mail starts up an application in the first terminal device. The first terminal device calculates a hash value as one example of a value specific to a file to be transmitted, which is a file being executed (step S21). Here, the operation in step S21 may be performed by executing the application while the file is open, or the operation in step S21 may be performed by starting up the application and opening the file as the application is executed.

The user brings the first terminal device closer to the second terminal device used by an authorizer. Thus, when the second terminal device is present within a distance allowing short-range communication from the first terminal device, the first terminal device requests a digital signature, by transmitting the hash value calculated in step S21 to the second terminal device (step S22). It is again assumed, for example, that the user shows a file of interest on a screen or on a document which is a printed matter to an authorizer such as a supervisor, reports contents thereof, obtains approval, and then brings the terminal device closer.

When the second terminal device receives a hash value of a file transmitted from the first terminal device, it generates a digital certificate by encryption with its own secret key (step S23). Here, the second terminal device may display on display 14, a screen for checking whether or not a digital signature can be attached, accept an instruction for a digital signature from the user who is the supervisor, and then carry out encryption.

The second terminal device transmits the encrypted hash value which is the digital signature to the first terminal device (step S24).

The first terminal device which received the encrypted hash value which is the digital signature transmits the same together with a file to be transmitted to the user of PC 500 which is a designated transmission destination via mail (step S25).

To the file transmitted via mail in this example, the digital signature of the user of the second terminal device who is the authorizer (the hash value encrypted with the encryption key of the authorizer) is attached. Therefore, the user of PC 500 who received this file via mail can use the public key of the authorizer to decrypt the encrypted hash value which is the digital signature, and can obtain the hash value. In addition, the user can obtain the hash value by applying the hash function to the received file. Then, the user can check authenticity of a sender, based on comparison of these two hash values.

Thereafter, the first terminal device erases the encrypted hash value received from the second terminal device from the storage area (step S26). Thus, usage unintended by the authorizer such as transmission of another file with the use of a digital signature once obtained from the authorizer can be prevented.

<Functional Configuration>

Figure 9:
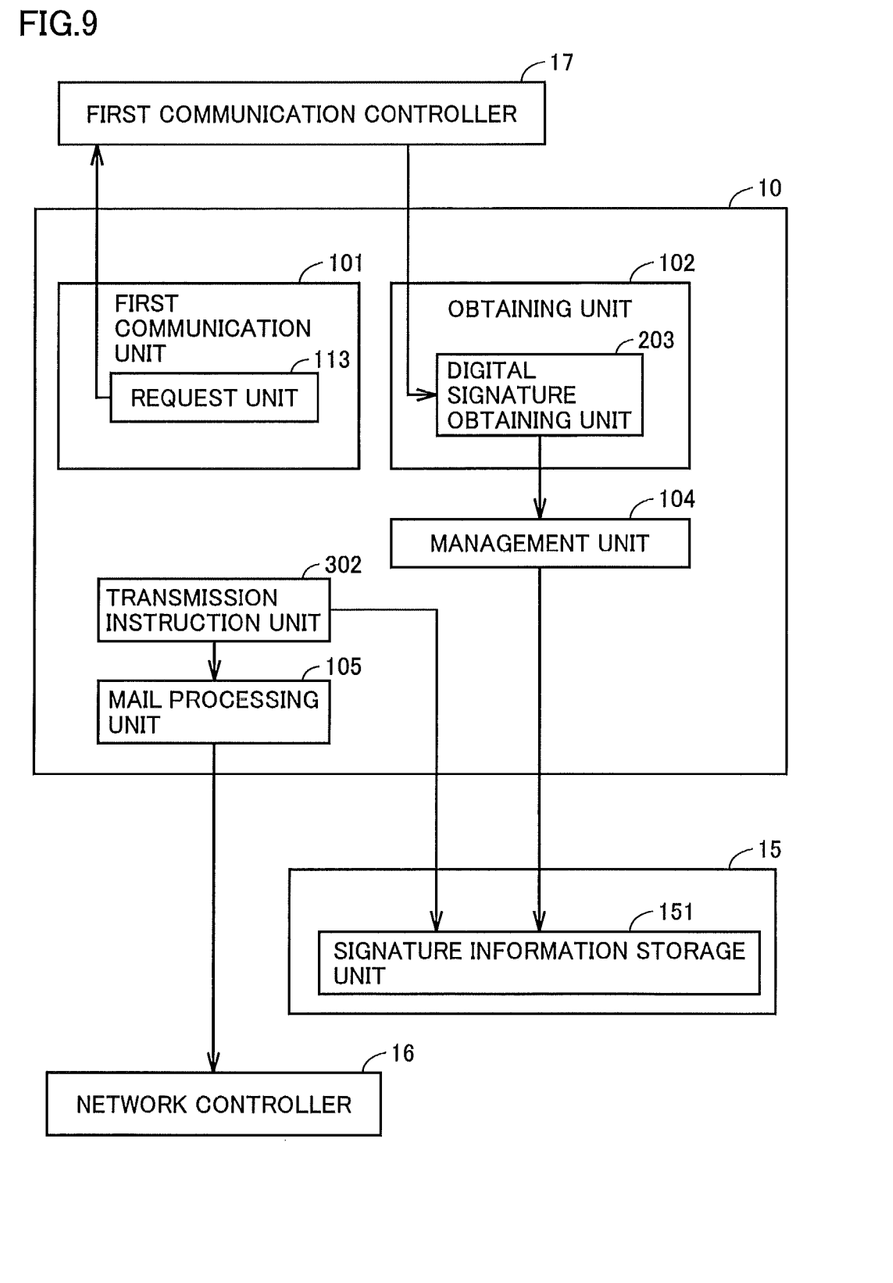
FIG. 9 is a block diagram showing a specific example of a functional configuration of a terminal device according to the second embodiment.

FIG. 9 is a block diagram showing a specific example of a functional configuration of terminal device 100 for performing the operations above. Each function shown in FIG. 9 is realized also mainly by CPU 10 as CPU 10 reads and executes a program (an application) stored in ROM 11 while it develops the program (application) on RAM 12. At least a part thereof, however, may be realized by the hardware configuration represented in FIG. 2. It is noted that a feature having the same reference numeral as in the block diagram in FIG. 5 represents a function similar to that of terminal device 100 according to the first embodiment represented in FIG. 5.

Namely, referring to FIG. 9, in terminal device 100 according to the second embodiment, memory 15 includes signature information storage unit 151 as in terminal device 100 according to the first embodiment.

Referring further to FIG. 9, CPU 10 includes first communication unit 101, obtaining unit 102, management unit 104, and transmission instruction unit 302, as in terminal device 100 according to the first embodiment. In terminal device 100 according to the second embodiment, CPU 10 further includes a mail processing unit 105 for performing processing for transmitting a mail to a designated destination through network controller 16. In addition, obtaining unit 102 includes a digital signature obtaining unit 203 for obtaining as a digital signature, information obtained by encrypting a hash value which is one example of a value obtained from a file to be transmitted, from another terminal device through first communication controller 17, instead of generation unit 201 and encryption unit 202 included in obtaining unit 102 according to the first embodiment. In addition, first communication unit 101 includes a request unit 113 for requesting a digital signature by transmitting a hash value which is one example of a value obtained from a file to be transmitted, to another terminal device through first communication controller 17, instead of request unit 111 and authentication information input unit 112 included in first communication unit 101 according to the first embodiment.

In the second embodiment, management unit 104 manages an encrypted hash value which is a digital signature obtained from the second terminal device. Specifically, management unit 104 causes signature information storage unit 151 which is a prescribed storage area to store a digital signature, and erases such information from signature information storage unit 151 after an instruction for mail transmission is output from transmission instruction unit 302.

In terminal device 100 according to the second embodiment, transmission instruction unit 302 reads a digital signature from the second terminal device which is stored in signature information storage unit 151, passes the digital signature to mail processing unit 105, and outputs an instruction for mail transmission of the digital signature and a file to mail processing unit 105.

<Operation Flow>

Figure 10:
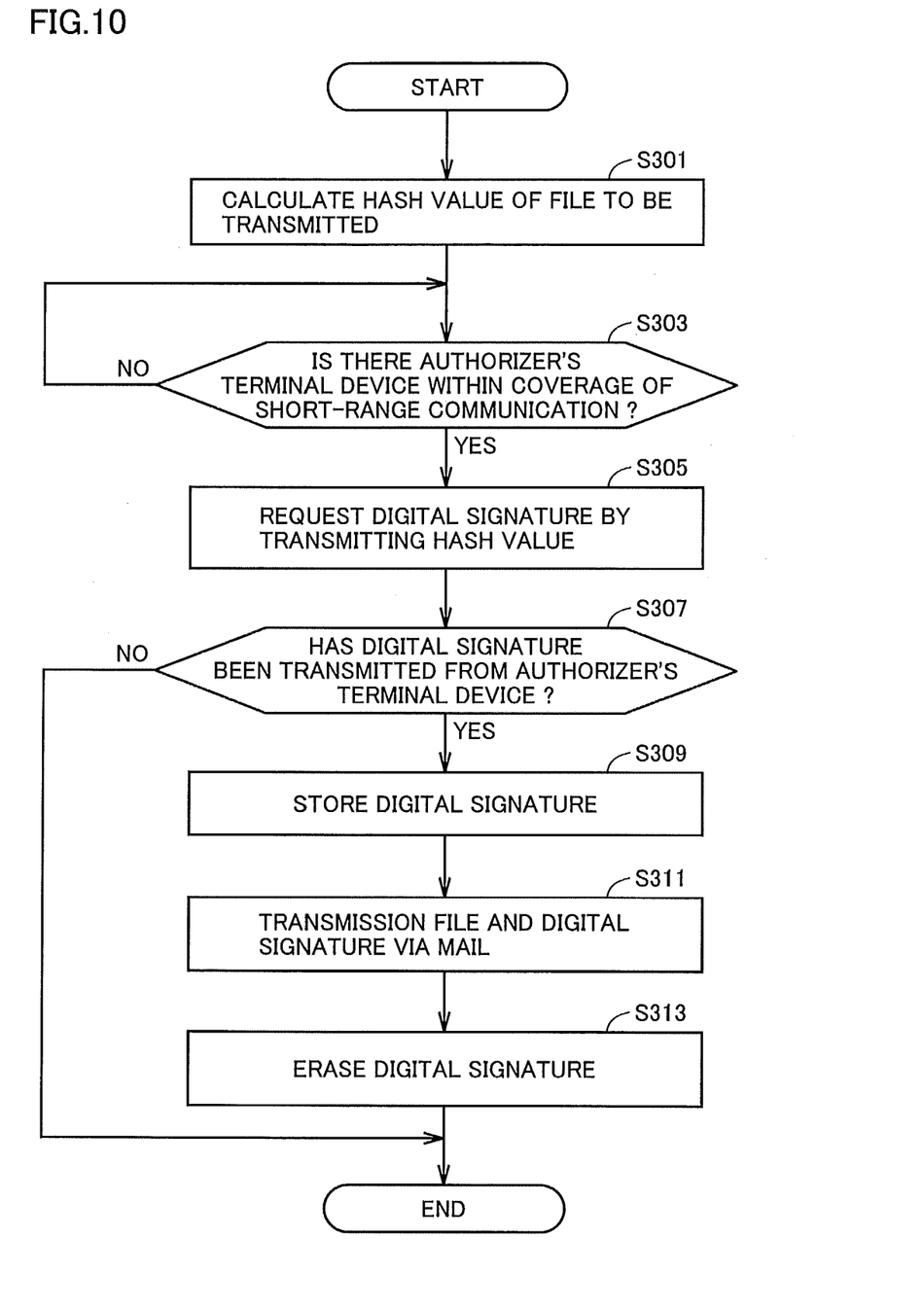
FIG. 10 is a flowchart representing a flow of operations in a first terminal device according to the second embodiment.

FIG. 10 is a flowchart representing a flow of operations in first terminal device 100A according to the second embodiment. The operation represented in the flowchart in FIG. 10 is started as CPU 10 in first terminal device 100A reads and starts up a program (an application) stored in ROM 11. This operation is realized as CPU 10 executes the program while it develops the program on RAM 12 and exhibits each function in FIG. 9.

Referring to FIG. 10, when the application is started up, CPU 10 calculates a hash value as one example of a specific value of an opened file or a file to be transmitted as it is operated to open, in accordance with the program (step S301). Then, CPU 10 monitors whether or not second terminal device 100B which is an authorizer's terminal device is present within a prescribed distance which is a distance allowing short-range communication.

When presence of second terminal device 100B within the prescribed distance is detected (YES in step S303), CPU 10 requests a digital signature by carrying out short-range communication with second terminal device 100B and transmitting the hash value calculated in step S301 to second terminal device 100B (step S305).

When the encrypted hash value is transmitted as the digital signature from second terminal device 100B while short-range communication has continued (YES in step S307), CPU 10 causes the digital signature to be stored in a prescribed storage area (step S309). Then, CPU 10 transmits via mail the received digital signature and the file to be transmitted to the user of PC 500 which is the designated destination (step S311). Thereafter, CPU 10 erases the encrypted hash value which is the digital signature from the prescribed area in memory 15 (step S313). Then, CPU 10 ends a series of operation. In this case, the file is transmitted via mail from the first terminal device to the user of PC 500 which is the designated destination, with the encrypted hash value which is the digital signature being attached.

It is noted that, when an encrypted hash value as a digital signature was not transmitted from the second terminal device while short-range communication has continued or when short-range communication has already ended and reception has failed even though a digital signature was transmitted (NO in step S307), CPU 10 skips subsequent operations. Then, CPU 10 ends a series of operations. In this case, a file is not transmitted.

Namely, in order to request second terminal device 100B to provide a digital signature in step S303 and to receive the same in step S307, short-range communication with second terminal device 100B should continue from request of a digital signature at least until reception of the digital signature.

It is noted that, in the second embodiment, a file to be transmitted is stored in advance in first terminal device 100A. Similarly to the example in the first embodiment, however, a file may be obtained by scanning with MFP 300. In this case, for example, in first terminal device 100A, before the series of operations, MFP 300 may be instructed to perform a scanning operation to thereby obtain a file or a hash value. In addition, in this case, while a file main body is stored in MFP 300, MFP 300 may be instructed to carry out mail transmission of the file and a digital signature, as first terminal device 100A transmits an encrypted hash value which is a digital signature obtained from second terminal device 100B to MFP 300, as in the first embodiment.

It is noted that, in the case of an operation in coordination with MFP 300, first terminal device 100A may obtain information for log-in to MFP 300 from second terminal device 100B, as in the first embodiment. The information for log-in to second terminal device 100B may be transmitted before a digital signature from second terminal device 100B. In this case, CPU 10 of first terminal device 100A may cause the received log-in information to be stored in association with a file to be transmitted. Then, in logging in MFP 300, when log-in information has been stored in association with a file to be transmitted, CPU 10 may transmit the log-in information (the log-in information of the user of second terminal device 100B) to MFP 300 and request log-in processing. Alternatively, when log-in information has not been stored, CPU 10 may transmit log-in information of the user of first terminal device 100A and request log-in processing. In this case as well, CPU 10 erases also the stored log-in information at the time when a digital signature is erased in step S313.

Effect of Embodiments

As the operation according to the first embodiment or the operation according to the second embodiment as described above is performed in first terminal device 100A, when the user transmits via mail a file after he/she obtains approval from an authorizer such as a supervisor, the user can obtain authorization from the authorizer with such an easy operation as simply bringing terminal devices closer to each other. In addition, the authorizer can also give approval with a simplified operation.

<Variation>

Separately from the example above, in the case that an application is executed in first terminal device 100A while a file is open or in the case that short-range communication with second terminal device 100B which is an authorizer's terminal device is started while an application is started up and a file is open as the application is executed, CPU 10 of first terminal device 100A may request second terminal device 100B to give approval. In this case, second terminal device 100B transmits information indicating approval based on an instruction from the user (authorizer) to first terminal device 100A. When CPU 10 of first terminal device 100A receives the information while short-range communication has continued, it adds a prescribed image to a position of the file defined in advance. This image may be an image based on identification information of the user who is the authorizer, which is included in the information indicating approval, such as an electronic seal, or may simply be an image defined in advance, such as "approved".

By doing so as well, when the user who desires to obtain approval obtains approval of a file from an authorizer such as a supervisor, he/she can obtain authorization from the authorizer with such an easy operation as simply bringing terminal devices to each other. In addition, the authorizer can also give approval with a simplified operation.

In addition, a program (application) for causing CPU 10 of first terminal device 100A to perform the operation described above can also be provided. Such a program (application) can be recorded on a computer-readable recording medium such as a flexible disk, a CD-ROM (Compact Disk-Read Only Memory), a ROM, a RAM, and a memory card adapted to a computer, and can be provided as a program product. Alternatively, the program can also be recorded and provided in a recording medium such as a hard disk contained in the computer. Further, the program can also be provided by downloading through the network.

The program according to the present invention may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present invention.

Alternatively, the program according to the present invention may be provided in a manner incorporated as a part of another program. In such a case as well, the program itself does not include the module included in another program, but the program executes the processing in cooperation with another program. Such a program incorporated in another program may also be encompassed in the program according to the present invention.

The provided program product is installed in a program storage portion such as a hard disk for execution. It is noted that the program product includes the program itself and the recording medium recording the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A terminal device configured to output an instruction for mail transmission of a file, comprising:
    a first communication unit configured to carry out communication with another terminal device of an authorizer when a distance from said another terminal device is not greater than a prescribed distance; and
    a hardware processor configured to generate an encryption key and information paired with the encryption key for analysis of information encrypted with the encryption key, wherein
        the first communication unit is configured to (i) request the another terminal device of the authorizer to provide information for proving that the information for analysis is authentic, by transmitting the information for analysis to the another terminal device of the authorizer, when the distance from the another terminal device of the authorizer is not greater than the prescribed distance, and (ii) obtain the information for proving from the another terminal device of the authorizer in response to the request, and
        the hardware processor is configured to (i) encrypt, with the generated encryption key, a value obtained from the file in the case where the information for proving from the another terminal of the authorizer has been obtained, and (ii) output an instruction for mail transmission of said file and the encrypted value, based upon the information received from the another terminal device of the authorizer.

2. The terminal device according to claim 1, further comprising:
a second communication unit configured to carry out communication with an image processing apparatus when a distance from said image processing apparatus is not greater than a prescribed distance, wherein
said second communication unit transmits to said image processing apparatus, said encrypted value and said information for proving when the distance from said image processing apparatus is not greater than said prescribed distance, and
said hardware processor outputs, to said image processing apparatus, an instruction for mail transmission of said file, said encrypted value, and said information for proving.

3. The terminal device according to claim 2, wherein said second communication unit is configured to transmit, to said image processing apparatus, a command instructing execution of a scanning operation for obtaining image data as said file when the distance from said image processing apparatus is not greater than said prescribed distance, and
said hardware processor is configured to output said instruction to said image processing apparatus when communication with said image processing apparatus has continued through said second communication unit from a time point of transmission of said command to said image processing apparatus until a time point of completion of said encryption processing in said hardware processor.

4. The terminal device according to claim 3, wherein said first communication unit is configured to receive information for log-in to said image processing apparatus from said another terminal device of the authorizer when the distance from said another terminal device of the authorizer is not greater than said prescribed distance, and
said second communication unit is configured to log in said image processing apparatus by using said information for log-in when said command is transmitted to said image processing apparatus.

5. The terminal device according to claim 2, wherein said hardware processor is configured to (i) cause a storage device to store said information for proving when said information for proving is obtained from said another terminal device of the authorizer, and (i) erase said information for proving from said storage device after said hardware processor outputs said instruction to said image processing apparatus.

6. The terminal device according to claim 1, wherein said information for proving is information obtained by encryption of the information for analysis by the another terminal device of the authorizer.

7. A mail transmission system, comprising:
a plurality of terminal devices; and
an image processing apparatus,
said plurality of terminal devices and said image processing apparatus being able to communicate with each other when they are at a prescribed distance or closer,
a first terminal device among said plurality of terminal devices including a hardware processor,
said mail transmission system:
generating an encryption key, in said hardware processor, and information paired with said encryption key, for analysis of information encrypted with said encryption key,
requesting a second terminal device, the second terminal device being a terminal device of an authorizer, among said plurality of terminal devices to provide information for proving that said information for analysis is authentic, by transmission of said information for analysis to said second terminal device when a distance from said second terminal device is not greater than said prescribed distance,
obtaining the information for proving from the second terminal device in response to the request,
encrypting with said encryption key, a value obtained from said file in the case where said information for proving from said second terminal device has been obtained, and
outputting an instruction for mail transmission of said file stored in said image processing apparatus, said encrypted value, and said information for proving, by transmission of said encrypted value and said information for proving to said image processing apparatus when a distance from said image processing apparatus is not greater than said prescribed distance.

8. The mail transmission system according to claim 7, wherein
the second terminal device includes a hardware processor configured to encrypt, with an encryption key, a value obtained from a file, and
the information for proving is information obtained by encryption of the information for analysis by another terminal device.

9. A non-transitory computer-readable storage medium storing a program for causing a controller of a terminal device to perform processing for outputting an instruction for mail transmission of a file, said terminal device including a communication unit capable of communicating with each of another terminal device of an authorizer and an image processing apparatus when a distance from each of said another terminal device of the authorizer and said image processing apparatus is not greater than a prescribed distance, said program causing said controller to perform the steps of:
generating an encryption key and information paired with said encryption key, for analysis of information encrypted with said encryption key;
requesting said another terminal device of the authorizer to provide information for proving that said information for analysis is authentic, by transmitting said information for analysis to said another terminal device of the authorizer, when the distance from said another terminal device of the authorizer is not greater than said prescribed distance;
receiving said information for proving from said another terminal device of the authorizer and storing said information for proving;
transmitting a command to said image processing apparatus that instructs said image processing apparatus to perform a scanning operation and to obtain image data as said file when the distance from said image processing apparatus is not greater than said prescribed distance;
receiving from said image processing apparatus, said file or a value obtained from said file;
encrypting with said encryption key, the value obtained from said file when said information for proving is stored; and
instructing mail transmission of said file stored in said image processing apparatus, said encrypted value, and said information for proving, by transmitting said encrypted value and said information for proving to said image processing apparatus, when communication with said image processing apparatus has continued.

10. The non-transitory computer-readable storage medium according to claim 9, wherein the information for proving is information obtained by encryption of the information for analysis by the another terminal device of the authorizer.

11. The non-transitory computer-readable storage medium according to claim 9, wherein the program causes said controller to further perform the steps of:
transmitting to the image processing apparatus, the encrypted value and the information for proving when the distance from the image processing apparatus is not greater than the prescribed distance.

12. The non-transitory computer-readable medium according to claim 9, wherein the instructing of mail transmission of said file stored in said image processing apparatus occurs when communication with the image processing apparatus has continued from a time point of transmission of the command to the image processing apparatus until a time point of completion of encryption processing.

13. The non-transitory computer-readable medium according to claim 12, wherein the program causes said controller to further perform the steps of:
receiving information for log-in to the image processing apparatus from the another terminal device of the authorizer when the distance from the another terminal device of the authorizer is not greater than the prescribed distance, and
logging-in the image processing apparatus by using the information for log-in when the command is transmitted to the image processing apparatus.

14. The non-transitory computer-readable medium according to claim 9, wherein the program causes said controller to further perform the steps of:
storing, in a storage device, the information for proving when the information for proving is obtained from the another terminal device of the authorizer; and
erasing the information for proving, from the storage device, after the instruction is outputted to the image processing apparatus.

15. A method of mail transmission of a file in a terminal device, said terminal device including a first communication unit configured to communicate with another terminal device of an authorizer when a distance from said another terminal device of the authorizer is not greater than a prescribed distance, comprising the steps of:
generating, by a hardware processor of said terminal device, an encryption key and information paired with the encryption key, for analysis of information encrypted with the encryption key;
requesting, by said first communication unit of said terminal device, said another terminal device of the authorizer to provide information proving that the information for analysis is authentic, by transmitting the information for analysis to the another terminal device of the authorizer, when the distance between said terminal device and said another terminal device of the authorizer is not greater than said prescribed distance;
encrypting, by the hardware processor, with the encryption key, a value obtained from the file when the information for proving, from the another terminal device of the authorizer, has been obtained; and
outputting, by the hardware processor, an instruction for mail transmission of said file and the encrypted value.

* * * * *